United States Patent

Wachob et al.

[11] Patent Number: 5,652,574
[45] Date of Patent: Jul. 29, 1997

[54] DYNAMICALLY ADDRESSABLE COMMUNICATIONS SYSTEM AND METHOD

[75] Inventors: David E. Wachob, Elkins Park, Pa.; William H. Berkman, 145 E. 81st St. Apt. 6-D, New York, N.Y. 10028

[73] Assignee: William H. Berkman, New York, N.Y.

[21] Appl. No.: 384,671

[22] Filed: Feb. 2, 1995

Related U.S. Application Data

[63] Continuation of Ser. No. 1,054, Jan. 6, 1993, abandoned.

[51] Int. Cl.[6] ............... H04Q 7/00; H04Q 1/39; H04M 11/08; G08B 5/22
[52] U.S. Cl. ............... 340/825.44; 340/825.27; 340/825.53
[58] Field of Search ............... 340/825.52, 825.53, 340/825.21, 825.26, 825.27, 825.44, 825.47

[56] References Cited

U.S. PATENT DOCUMENTS

| | | | |
|---|---|---|---|
| 4,839,628 | 6/1989 | Davis et al. | 340/825.44 |
| 4,845,491 | 7/1989 | Fascenda et al. | 340/825.47 |
| 4,860,005 | 8/1989 | DeLuca et al. | 340/825.44 |
| 4,868,561 | 9/1989 | Davis | 340/825.44 |
| 4,894,649 | 1/1990 | Davis | 340/825.44 |
| 4,908,828 | 3/1990 | Tikalsky | 371/69.1 |
| 4,910,510 | 3/1990 | Davis et al. | 340/825.44 |
| 5,010,330 | 4/1991 | Snowden et al. | 340/825.21 |
| 5,012,234 | 4/1991 | Dulaney et al. | 340/825.44 |
| 5,025,491 | 6/1991 | Tsuchiya et al. | 340/825.52 |
| 5,030,948 | 7/1991 | Rush | 340/825.53 |
| 5,065,423 | 11/1991 | Gaskill | 340/825.44 |
| 5,093,659 | 3/1992 | Yamada | 340/825.53 |
| 5,371,493 | 12/1994 | Sharpe et al. | 340/825.44 |
| 5,381,138 | 1/1995 | Stair et al. | 340/825.44 |
| 5,414,418 | 5/1995 | Andros, Jr. | 340/825.44 |
| 5,416,827 | 5/1995 | Gaskill | 340/825.44 |

OTHER PUBLICATIONS

Motorola; "Watch Pager"; Brochure R3-5-151; 1990, USA.

*Primary Examiner*—Larry D. Donaghue
*Assistant Examiner*—Mark H. Rinehart
*Attorney, Agent, or Firm*—Woodcock Washburn Kurtz Mackiewicz & Norris LLP

[57] ABSTRACT

A dynamically-addressable communications system provides either a list or set of dynamic addresses to selected receivers for broadcasting information packets from a transmission source to the selected receivers. Each dynamic address provided in the set is associated with a particular information packet designated to be received by the particular selected receivers to which that dynamic address is provided. Additionally, each broadcasted information packet includes at least one dynamic address identical to the dynamic address provided to its associated selected receivers. Thus, the broadcasted information packet which includes such identical dynamic address may be received by its associated selected receivers, which then modify the dynamic address list. Preferably, after each selected receiver receives a broadcasted information packet, the dynamic address associated with that particular received information packet is removed from the list of dynamic addresses provided to that selected receiver at least temporarily.

17 Claims, 4 Drawing Sheets

DYNAMICALLY ADDRESSABLE COMMUNICATIONS SYSTEM AND METHOD

RELATED APPLICATIONS

This is a continuation of application Ser. No. 08/001,054, now abandoned filed on Jan. 6, 1993.

BACKGROUND OF THE INVENTION

1. Field of the Invention

This invention relates to electronic communication systems, particularly to such communication systems capable of addressably broadcasting information to certain receivers.

2. Description of the Background Art

Conventional communication systems are available for broadcasting signals from a transmission source over designated channels to various receivers listening to such channels. In such broadcasting configuration, however, it is sometimes desirable to control which receivers may receive the broadcasted information. Thus, so-called "addressable" communication systems, such as electronic remote paging systems, are provided which enable only addressed receivers to receive the broadcasted information.

Known addressable communication systems, however, are limited to the extent that the addressability of their receivers is not easily reconfigurable, particularly once the system has been deployed and also with respect to the specific type of information broadcasted. Therefore there is a need for addressable communication systems which facilitate dynamic reconfiguration of receiver addresses, preferably depending on the specific information broadcasted, thereby providing improved spectrum efficiency.

SUMMARY OF THE INVENTION

In accordance with one embodiment of the present invention, either a list or set of dynamic addresses is provided to selected receivers in a communication system for addressably broadcasting information packets from a transmission source to such selected receivers. Each dynamic address provided in the list or set is associated with a particular information packet designated to be received by the selected receivers to which that dynamic address is provided. Additionally, each broadcasted information packet includes at least one dynamic address identical to the dynamic address provided to its associated selected receivers.

Thus, the broadcasted information packet which includes such identical dynamic addresses may be received by its associated selected receiver, at which time, the associated selected receiver modifies the list or set of dynamic addresses. Preferably, after each selected receiver receives a broadcasted information packet, the dynamic addresses associated with that particular received information packet is removed from the list or set of dynamic addresses provided to such selected receiver.

BRIEF DESCRIPTION OF THE DRAWINGS

FIGS. 3A–3C show various types of information packet 200.

DESCRIPTION OF THE PREFERRED EMBODIMENT

Figure 1:
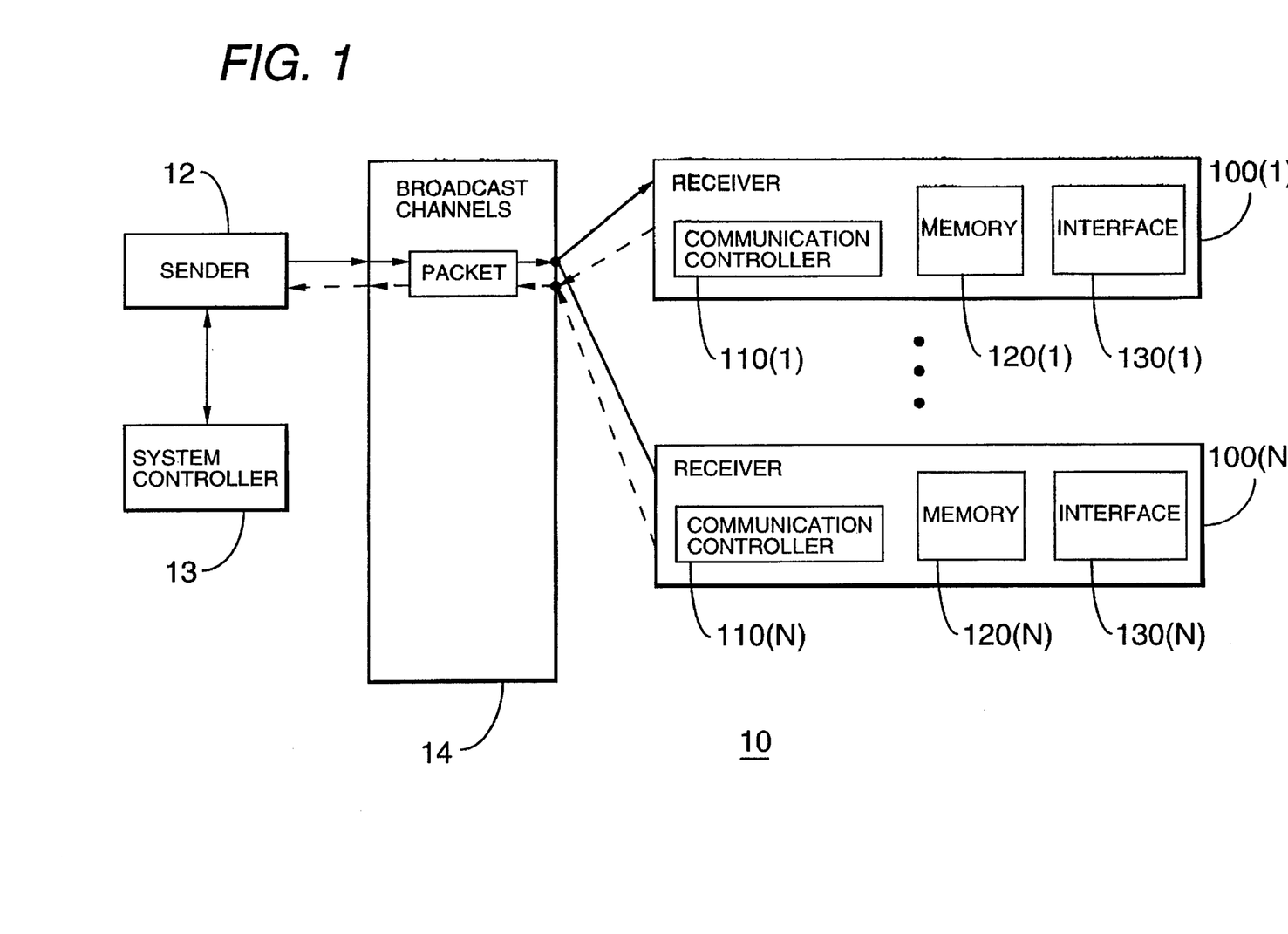
FIG. 1 is a block diagram of dynamically-addressable communications system 10, including broadcast source or sender 12 for transmitting digital information packet 200 through broadcast channels or network 14 to various receiver units 100.

FIG. 1 shows a block diagram of dynamically-addressable communications system 10, including broadcast source or sender 12 for transmitting information packet 200 through broadcast channels or network 14 to various receiver units 100. System 10 is dynamically-addressable to enable different users to receive the same or different information packets and to allow reconfiguration of different addresses at different times.

System controller 13 may cause sender 12 to send, or receive, packets 200 through channels 14, which may be one or two-way, wired or wireless broadcast channels, such as satellite, microwave, telephone, or the like. Moreover, packets 200 may be fixed or variable-length, digitally-encoded message streams or frames, including digital data and/or analog voice information. Thus, communication through channels 14 may comply with conventional broadcast communication technology.

Figure 2:
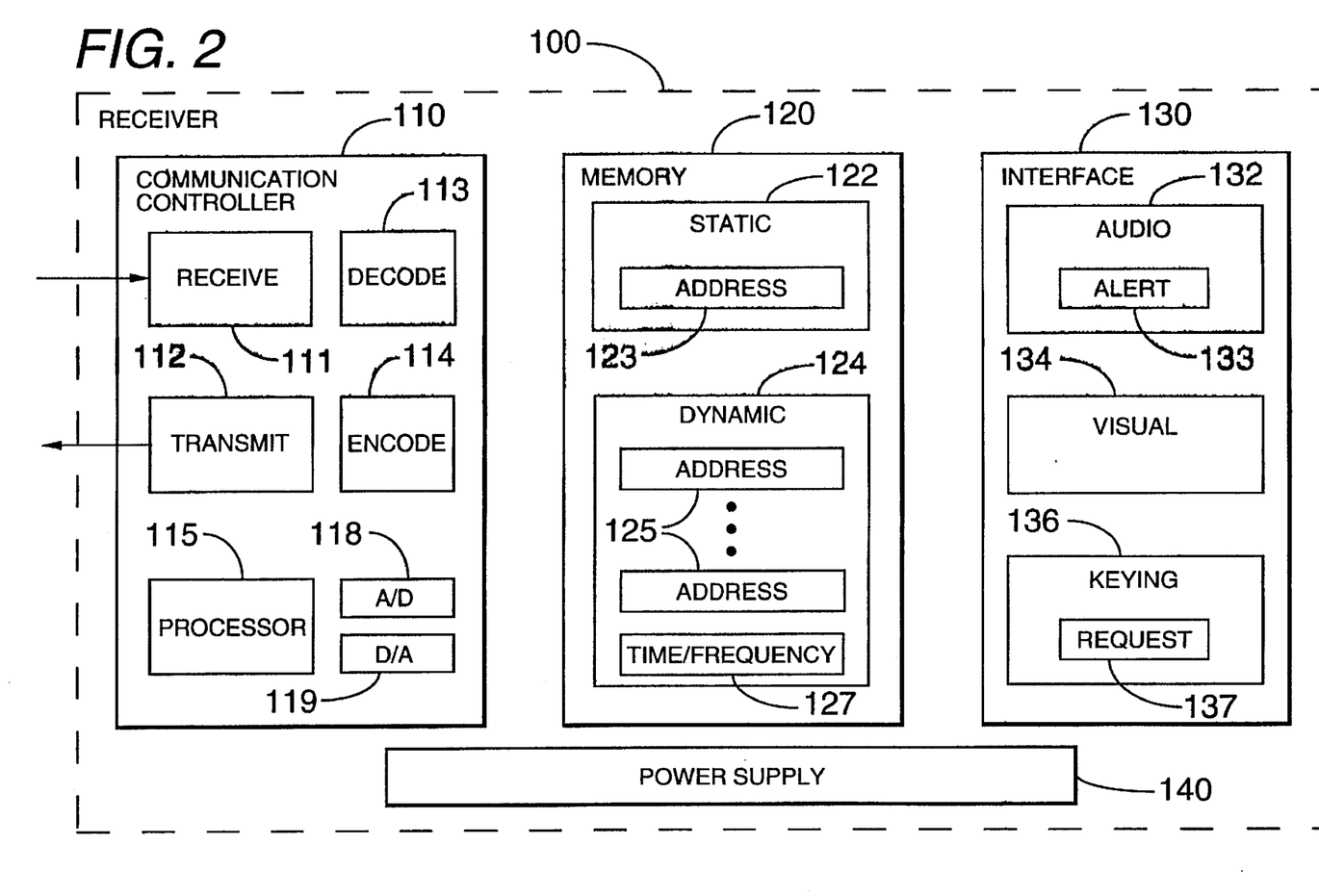
FIG. 2 block diagram of receiver unit 100, including communication controller 110, memory 120, interface 130, and power supply 140.

Multiple receiver units 100(1)–(N) communicate through channels 14 to receive simultaneously, and optionally send separately in a two-way configuration, packets of information to and from sender 12. As shown in FIG. 2 in additional detail, each receiver unit 100 includes communication controller 110, memory 120, interface 130, and power supply 140. Communication controller 110 includes conventional digital communications equipment for receiving 111, transmitting 112, decoding 113, and encoding 114 information signals as packets 200.

In addition, controller 110 includes conventional analog-to-digital (A/D) 118 and digital-to-analog (D/A) 119 circuitry for converting certain information contained in packets 200 into appropriate form. For example, received decoded packet information containing analog voice or music signals may be converted to digitized form for proper storage in memory 120. Controller 110 also includes processor 115, which may be a conventional microprocessor or microcontroller for processing information within receiver 100.

Memory 120 includes static 122 and dynamic 124 memory portions. Static memory 122 stores static address 123. Preferably, each receiver unit 100 stores a different static address 123 such that packets 200 destined for that particular receiver unit 100 may be addressed uniquely thereto. Dynamic memory 124 stores dynamic address list 125 and time and frequency "stamp" information 127.

Furthermore, user interface unit 130 includes microphone, speaker or audio interface 132, video display screen or visual interface 134, and switch key or keyboard interface 136. Audio interface 132 includes audible (e.g., speaker) 132 or visual (e.g., light bulb, LCD or the like) alert device 134. Keying interface 136 includes manual switch or entry device 137 to allow direct user request for information or for requesting for additional information. Power supply 140 is provided to provide power to receiver 100 components.

In accordance with the present invention, system 10 provides a list or set of dynamic addresses 125 to selected receivers 100 for receiving broadcasted information packets 200 from transmission source 12, 13 to selected receivers 100. Each receiver 100 may also be provided separately with unique static address 123. Each dynamic address provided in list 125 is associated with a particular information packet 200 designated to be received by particular selected receiver or receivers 100 to which that dynamic address 125 is provided. Additionally, each broadcasted information packet 200 includes at least one dynamic address 204, 207 or static address 202 which is identical to dynamic address in list 125 or static address 123 provided to selected receivers 100.

Thus, the broadcasted information packet 200 which includes such identical dynamic address 125 may be received by its associated selected receivers 100 and stored for subsequent retrieval, preferably according to prioritized storage sequence, in dynamic memory 124, where dynamic address list 125 may then be modified. Such storage may occur silently, i.e. without alerting the user of receiver 100, or noticeably by triggering device 133 to alert such user.

Preferably, after each selected receiver 100 receives broadcasted information packet 200, the dynamic address 125 associated with that particular received information packet 200 is removed or deleted by processor 115 from the list of dynamic addresses 125 provided to that selected receiver 100. Optionally, the removed dynamic addresses are stored temporarily, separately from list 125 in dynamic memory 124 in receiver 100.

The temporary storage of previously-removed dynamic addresses enables the user of receiver 100 to define or generate, according to a hierarchical address algorithm, additional dynamic addresses derived from or related to any of the temporarily stored addresses, for addition to and storage in list 125. In this way, after a user receives a certain packet 200 having a particular dynamic address 125, 204, 207 at which time such dynamic address is tentatively removed from list 125, the user may effectively request from sender 12 additional information related to such packet 200. Requesting additional information is accomplished by including such derived or related dynamic address or addresses in list 125.

Preferably, sender 12 is provided by system controller 13 with the same or equivalent algorithm for providing or assembling for transmission requested packets 200, such that dynamic addresses of such packets 200 are related to or derived from the temporarily stored addresses. For example, such requested packets 200 are defined and broadcasted by sender 12 such that the dynamic addresses associated with the requested packets are configured to be a hierarchical variation of the temporarily stored addresses, thereby enabling the user of receiver 100 to request effectively by defining different groups or subgroups of additional packets. The dynamic address may be iteratively varied by appending an incremental index thereto, for indicating sequential request relationship or hierarchical information derivation.

Moreover, users of receiver 100 may acquire or request, possibly by purchasing beforehand, list entries for dynamic addresses corresponding with "billing" or authorization credits to receive selected groups or subgroups of additional packets of information. To this end, such billing credits may be included in either initial or subsequent packets.

Optionally, dynamic address list 125 is provided by broadcast source or sender 12 which transmits dynamic address list 125 to receivers 100 over a predefined or "stamped" transmission frequency and time period 127, as stored previously in dynamic memory 124. The predefined transmission frequency and time period 127 are provided to broadcast source 12, by receivers 100 in a two-way communication configuration, or by system controller 13 in a one-way communication configuration to selected receivers.

At predefined intervals, system controller 13 may cause sender 12 to retransmit the same, previously transmitted dynamic address list 125. This retransmission ensures proper list reception by receivers 100. To ensure, however, that the same list is not received and stored duplicatively, receivers 100 store the time stamp information 106 from each received list in dynamic memory 124, and receiver processor 115 compare such stored information to identify redundant time stamp information. Thus, a duplicate list is received when redundant time stamp information is identified, and processor 115 causes receiver 100 not to store such duplicate list information.

When system 10 is operating, sender 12 may broadcast or transmit packets 200 to receiver 100 in one of three transmission modes: (1) Information Transmission, (2) Dynamic Address List Transmission, or (3) Download Information Transmission. In any mode, receiver 100 may receive information "silently," i.e., without alerting its user of incoming or received information, per user selection.

Figure 3A:
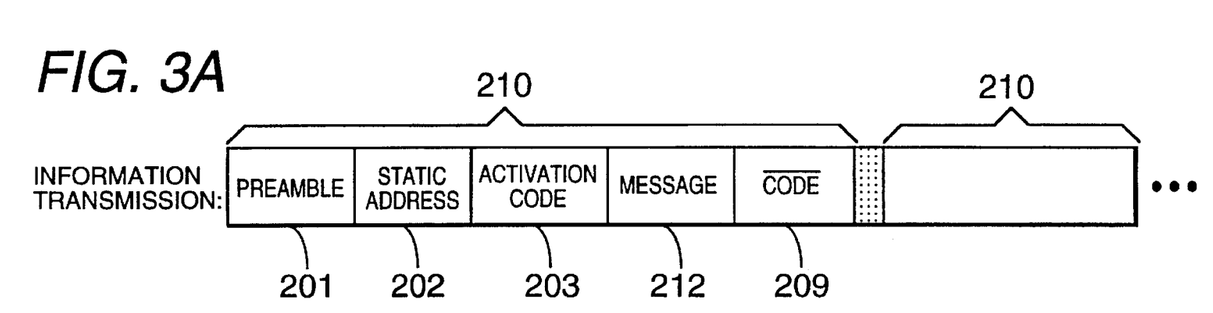
FIG. 3A is a diagram of information transmission packet 210.
Figure 3B:
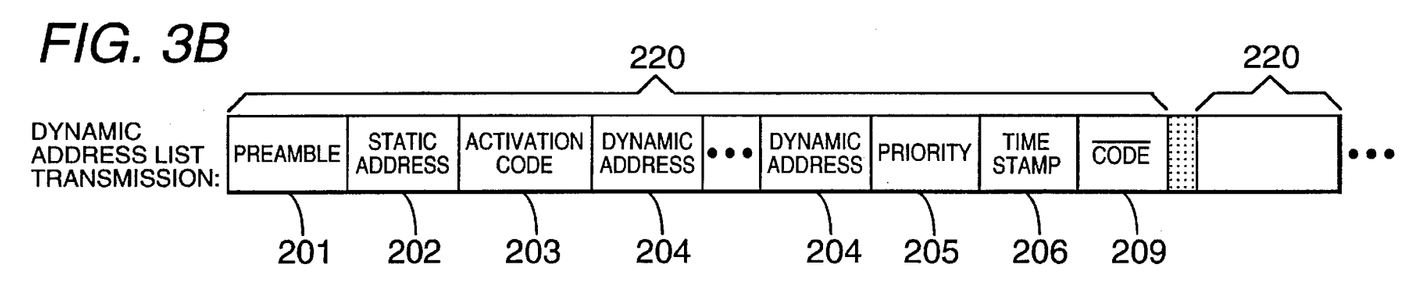
FIG. 3B is a diagram of dynamic address list transmission packet 220.
Figure 3C:
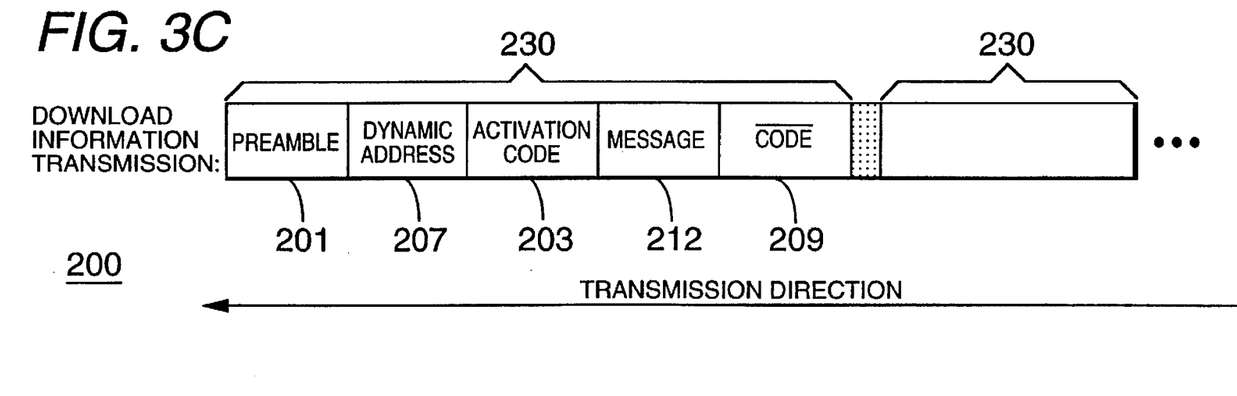
FIG. 3C is a diagram of download information transmission packet 230.

In FIGS. 3A–3C, various forms of information packet 200 are shown, in right-to-left transmission direction (i.e., where preamble 201 leads the transmitted information stream of each packet,) corresponding respectively to the transmission modes of system 10: (1) Information Transmission Packet 210, (2) Dynamic Address List Transmission Packet 220, and (3) Download Information Transmission Packet 230.

For each packet type 210, 220, and 230, preamble portion 201 preferably includes a toggling binary signal (e.g., . . . 0101010 . . . ) followed by an identifiable start-code pattern which serves to begin the digital bit stream. Next, for packet types 210 and 220, static address field 202 is included in the packet to correspond with information stored in static address 123 in memory 120 of receiver 100. In comparison, for packet type 230, dynamic address field 207 is included corresponding to information stored in either static address 123 or dynamic addresses 125. After address field 202 or 207, an activation code field 203 is included to identify which transmission mode (i.e., (1), (2), or (3)) and packet type 210, 220, or 230 apply to that packet 200.

In the case of packet types 210, 230, activation code field 203 is followed by fixed or variable-width message field 212, which may include analog voice and/or digital data information. Then, for such packet types 210, 230, an "inverse" activation code field 209 follows message field 212 to indicate end of packet.

When message field 212 is formatted as having a particular fixed width, multiple message fields 212 included in different packets 210, 230 may be separately received and combined in proper sequence by receiver 100 to create or assemble a message stream having a bit width which is wider than the particular fixed-width.

Preferably, processor 115 in receiver 100 monitors incoming packet field information to recognize when fixed-width message field 212 is intended to be combined with other such fixed-width message fields 212, as may be designated by multiple-message flag included in priority field 205 associated with such received message fields 212.

Moreover, in the case of packet type 220, activation code field 203 is followed by a list, set or series of at least one dynamic address field 204. Dynamic address fields 204 are followed by prioritization field 205, which defines the sequential order by which subsequent message packet or field 212 is stored in memory 124 upon receipt of downloaded information packet 230. Prioritization field 205 is followed by time stamp field 206, which includes time period and frequency information corresponding to time period and frequency information 127 stored in dynamic memory 124 in receiver 100.

Finally, time stamp field 206 is followed by "inverse" activation code field 209 to indicate end of packet type 220. Note that particular packet types 210, 220, or 230 may follow additional packet types serially in transmission, as shown.

Figure 4:
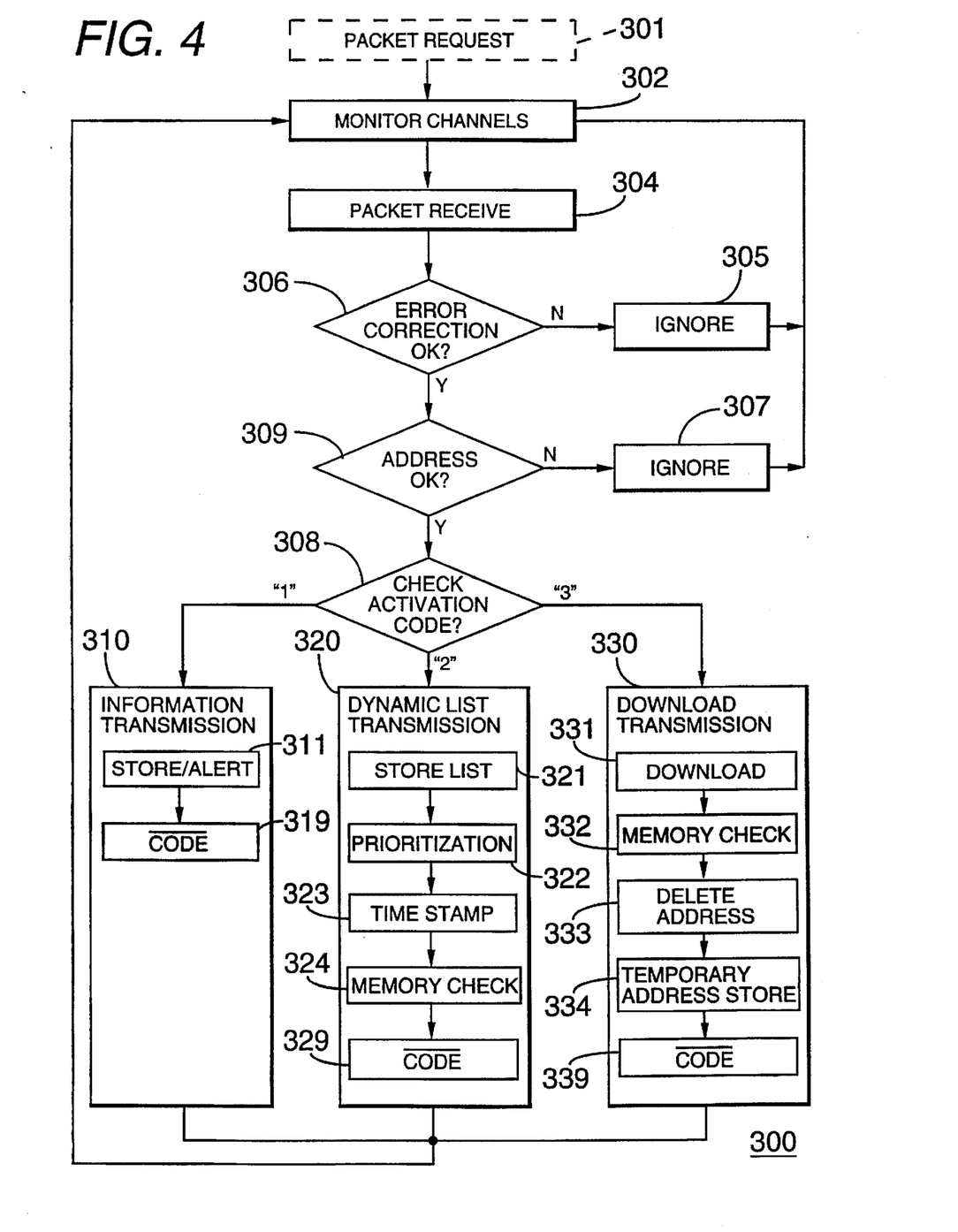
FIG. 4 is a flow chart of steps performed by receiver unit 100 for receiving digital information packet 200.

In FIG. 4, a flow chart of steps performed generally by receiver unit 100 for receiving packet 200 is shown. The process flow may be started at step 301 (packet request), or, more typically, by entering directly at step 302 (monitor channels), thereby bypassing step 301 which is optional.

In step 301, a particular receiver 100 may indicate to system controller 13, in optional two-way communication configuration, that such receiver 100 requests packet transmission. In this regard, processor 115 in communication controller 110 for such receiver 100 causes transmit 112 and encode 114 units to send an upstream signal to sender 12, for example, requesting packet information by including in such request specific dynamic address 125 information associated with the requested information.

Such requests for information are handled internally in receiver 100 and enabled by user entry through keying interface 136 in interface 130. Also, information request may be achieved by user through either keypad entry or voice recognition at interface 130, if appropriately configured to receive such additional information request.

Preferably, however, step 301 is omitted because receivers 100 do not necessarily request packet transmission, but rather react to packets sent on a one-way channel. Even without requesting packets at step 301, system 10 may nonetheless operate by enabling receivers 100 to monitor intermittently or continuously various broadcast channels or transmission networks 14, through which information packets 200 may be sent from sender 12. When information packet 200 is so transmitted, receiver 100 receives such information packet 200, at least temporarily at step 304, by communication controller recognizing preamble 201. At decision step 306, forward error correction is performed by processor 115 in communication controller 110 on the received information packet 200, such that if error correction fails, then the information packet 200 is ignored at step 305 and channel-monitoring step 302 is repeated.

Next, at decision step 309, processor 115 reads address field 202 or 207 to recognize whether the address contained in that information packet 200 is identical to any address in memory 120 of the particular receiver 100 (i.e., static address 123 or dynamic addresses 125). If such comparison does not result in recognizing the same address (i.e., the received packet 200 is not designated for reception at that receiver 100), then the packet 200 is ignored at step 307 and channel-monitoring step 302 is repeated.

Next, at decision step 308, processor 115 reads activation code field 203 to identify which of the transmission mode (i.e., 1, 2, or 3), and, thus, corresponding packet type (i.e., 210, 220, or 230) applicable to the received packet 200. Hence, if transmission mode is "1", then Information Transmission operational step 310 is performed. In step 310, packet type 210 is further processed, and the content of message field 212 is downloaded by processor 115 at step 311 for storing in dynamic memory 124 and optional alerting of user. In this way, alert device 133 may be activated, in conventional paging operation, and an alert message may be generated either visually or audibly, for example, using visual interface 134 or audio interface 132, to notify user of receiver 100 about incoming stored information. Note that in this operational mode, only static addresses are included in packet type 210.

If processor 115 determines from activation code field 203 at decision step 308 that transmission mode is "2", then Dynamic List Transmission operational step 320 is performed. In step 320, packet type 220 is further processed, and data or address list information contained in dynamic address fields 204 in packet type 220 are stored or downloaded 321, "silently," to dynamic addresses 125 in dynamic memory 124 of memory 120 of those receivers 100 which receive packet 220. Optionally, processor 115 may dynamically define a modifiable, maximum limit on the size of message packets 212 which each receiver 100 may download into dynamic memory 124. Additionally in the case of including downloadable "credits" in message packets 212, a similar limit on the size and number of such message packets 212 may be defined.

Next, at step 322, prioritization information from priority field 205 is read by processor 115 and stored in dynamic memory 124 to prioritize the sequential access subsequently of stored information, i.e., by prioritizing the sequential memory pointers for accessing message packets 212. Next, at step 323, time stamp field 206 is stored in dynamic memory at information field 127. Preferably, time/frequency information stored in field 127 is read by processor 115 to cause power supply 140 to power-on and enable the receiver to receive information on an assigned channel frequency and at designated packet broadcast periods, even to override manual shut-off, thereby saving available power of receiver 100.

Next, at step 324, processor 115 performs memory checking to determine whether any of the dynamic addresses 204 for downloading were previously in dynamic memory 124. If so, such redundant dynamic addresses 204 are not downloaded and are ignored.

If processor 115 determines from activation code field 203 at decision step 308 that transmission mode is "3", then Download Transmission operational step 330 is performed. In step 330, packet type 230 is further processed, and information contained in message field 212 is stored or downloaded 331 in dynamic memory 124 of memory 120 in receiving receiver 100, possibly silently without alerting the user. Note that dynamic address 125 stored in memory 124 refers to corresponding address of packet to be received, not necessarily to address in memory where message packet 212 is actually stored.

This downloaded information may be retrieved subsequently, preferably according to predefined prioritization stored in dynamic memory 124, by the user of receiver 100 for playback through audio or visual interfaces 132, 134, and either deleted or saved for future retrieval.

Next, at step 332, processor 115 performs memory checking to determine whether dynamic memory 124 is close to capacity for storing additional information packet 200 information therein. If so, processor 115 may either stop storing such additional information, or store only higher priority dynamic addresses 204, according to prioritization field 205, until remaining memory is fully utilized. Note that after information is successfully downloaded in dynamic memory 124 corresponding to particular dynamic address 125, that particular dynamic address is deleted or removed, preferably tentatively, by processor 115 from dynamic memory 124, at step 333.

Next, at step 334, the removed dynamic address is temporarily stored separately in dynamic memory 124 for possible subsequent use when user of receiver 100 effectively issues additional information request, particularly when such request derives from or relates to specifically a prior information packet 200 having such removed dynamic address. As discussed above, such additional information request is accomplished by the user requesting additional information, which in turn generates new dynamic addresses which are a predefined variant of the removed dynamic address to dynamic address list or set 125. It is also contemplated that user request of primary information may be accomplished through keypad communication.

At the end of each operational step 310, 320, and 330, inverse activation codes 209 are identified by processor 115 respectively at steps 319, 329, and 339, to recognize the end of each particular packet type. Finally, channel-monitoring step 302 may be repeated.

We claim:

1. A method for dynamically-addressable transmission of information packets from a broadcast source to a plurality of receivers, the method comprising the steps of;

(a) providing at least one of a plurality of receivers with a set of at least one dynamic address in a first transmission, each provided dynamic address in the set being associated with a particular information packet designated to be received by at least one corresponding receiver to which such dynamic address is provided; and (b) transmitting at least one of the designated information packets from a broadcast source to the plurality of receivers in a second transmission, at least one of the transmitted information packets including at least one dynamic address which is the same as one of the provided dynamic addresses, wherein each address is receivable by each corresponding receiver to which such dynamic address has been provided, and upon such reception, each corresponding receiver modifies the provided dynamic address set;

wherein step (a) includes storing the set of dynamic addresses provided to each receiver in dynamic memory included in each such receiver before separate transmission of information identified by said set of dynamic addresses, and wherein at least one of the provided dynamic addresses corresponds with a billing credit; and wherein, in step (b), the modification by each corresponding receiver of the provided dynamic address set includes removing the dynamic address associated with a received information packet from the set of dynamic addresses provided to the corresponding selected receiver after that receiver receives such information packet and storing the removed dynamic address temporarily to permit a user to request additional packet information related to the temporarily stored dynamic address.

2. The method of claim 1 wherein providing includes:

a user request for at least one dynamic address to be added to the provided set of dynamic addresses in a receiver.

3. The method of claim 2 further comprising:

adding at least one dynamic address in response to a non-real-time user requesting transmission of additional information through a key interface.

4. The method of claim 1 wherein:

the set of dynamic addresses is provided in response to user request for information through manual entry.

5. The method of claim 1 wherein:

the provided set of dynamic addresses is dynamically reconfigurable at the receiver.

6. The method of claim 1 wherein:

the set of dynamic addresses is provided in a pre-transmission without information, by the broadcast source transmitting such set of dynamic addresses to the plurality of receivers over a predefined transmission frequency and time period.

7. The method of claim 6 wherein:

the predefined transmission frequency and time period is settable prior to transmission and is stored in at least one of the receivers.

8. The method of claim 6 wherein:

the set of dynamic addresses is provided to a particular receiver even when the particular receiver is powered-down by the user, by causing the particular receiver to power-up during a predefined, settable, time period and frequency.

9. The method of claim 1 wherein:

the transmitted information packet is received, is stored, and is retrieved according to an alterable sequence for retrieval priority.

10. A messaging system, comprising:

(a) a plurality of receivers;

(b) means for providing said receivers with a set of at least one dynamic address, each provided dynamic address in the set being associated with a particular information packet designated to be received by at least one corresponding receiver to which such dynamic address is provided, wherein at least one of the provided dynamic addresses corresponds with a billing credit; and (b) source means for transmitting at least one of the designated information packets to the plurality of receivers;

wherein at least one of the transmitted information packets includes at least one dynamic address which is the same as one of the provided dynamic addresses, wherein each address is receivable by each corresponding receiver to which such dynamic address has been provided, and upon such reception, each corresponding receiver modifies the provided dynamic address set;

wherein each of said receivers includes dynamic memory for storing the set of dynamic addresses provided to each receiver before separate transmission of information identified by said set of dynamic addresses; and wherein the modification by each corresponding receiver of the provided dynamic address set includes removing the dynamic address associated with a received information packet from the set of dynamic addresses provided to the corresponding selected receiver after that receiver receives such information packet, and storing the removed dynamic address temporarily to permit a user to request additional packet information related to the temporarily stored dynamic address.

11. The system of claim 10, wherein said means for providing includes means for adding, in response to a user request, at least one dynamic address to the provided set of dynamic addresses in a receiver.

12. The system of claim 11, further comprising means for adding at least one dynamic address in response to a non real-time user requesting transmission of additional information through a key interface.

13. The system of claim 10, wherein the set of dynamic addresses is provided in response to user request for information through manual entry.

14. The system of claim 10, wherein the provided set of dynamic addresses is dynamically reconfigurable at the receiver.

15. The system of claim 10, wherein the set of dynamic addresses is provided in a pro-transmission without information over a predefined transmission frequency and time period.

16. The system of claim 15, wherein the predefined transmission frequency and time period is sortable prior to transmission and is stored in at least one of the receivers.

17. The system of claim 15, wherein the set of dynamic addresses is provided to a particular receiver even when the particular receiver is powered-down by the user, by causing the particular receiver to power-up during a predefined, settable, time period and frequency.

* * * * *

UNITED STATES PATENT AND TRADEMARK OFFICE
CERTIFICATE OF CORRECTION

PATENT NO : 5,652,574
DATED : July 29, 1997
INVENTOR(S) : Wachob et al

It is certified that error appears in the above-identified patent and that said Letters Patent is hereby corrected as shown below

```
Column 1, line 65, after "2" insert --is a--
Column 9, line 8, delete "pro-transmission" and insert
therefor --pre-transmission--
Column 10, line 2, delete "sortable" and insert therefor
--settable--
```

Signed and Sealed this

Third Day of February, 1998

Attest:

BRUCE LEHMAN

Attesting Officer

Commissioner of Patents and Trademarks